A. A. HARVIE.
MARKING GAGE.
APPLICATION FILED JULY 2, 1910.

998,688.

Patented July 25, 1911.

Witnesses:
Ephraim Banning
Jno. P. Bond

Inventor:
Albert A. Harvie.
By Banning & Banning
Attorneys.

COLUMBIA PLANOGRAPH CO., WASHINGTON, D. C.

UNITED STATES PATENT OFFICE.

ALBERT A. HARVIE, OF OTTUMWA, IOWA.

MARKING-GAGE.

998,688. Specification of Letters Patent. Patented July 25, 1911.

Application filed July 2, 1910. Serial No. 570,073.

*To all whom it may concern:*

Be it known that I, ALBERT A. HARVIE, a citizen of the United States, residing at Ottumwa, in the county of Wapello and State of Iowa, have invented certain new and useful Improvements in Marking-Gages, of which the following is a specification.

In certain woodworking operations it is desirable to be able to mark two or more parallel lines on a board at a certain distance from its edge, as, for example, when a groove is to be cut in the surface of the board at a specified distance from the edge. In order to make these marks quickly and space them accurately, it is desirable to have an instrument which will make both of the marks at once. Such an instrument should be provided with two or more adjustable rods or their equivalent, fixed to a common frame or base in such a manner that the distances between the marking edges of the rods from each other, and also their distance from the frame which contacts the edge of the board, may be adjustable. Also, the instrument should be one having the fewest possible number of parts, so that it can be cheaply made and so as to have great strength and durability. Scales should be provided on the rods in such manner that they can be immediately adjusted to any desired position without the necessity of using any other measuring instrument. Also, these scales should be so located on the rods that they may be read with the greatest amount of convenience and accuracy.

Objects of the invention are, to provide a marking gage having two or more rods adjustable with respect to a common frame in such a way that the distance between the marking edges of the rods and their distance from the frame may be adjusted; to provide an instrument in which the rods may be all tightened by the same operation; to provide scales on the rods in such a way as to enable their adjustment with the greatest accuracy and facility; to provide a construction such that when desired it may be used for marking only one line with an accuracy and facility fully equal to that of the ordinary instrument; and to provide a novel and efficient marking edge or member which will mark the board in such manner that the mark may be seen with the greatest amount of facility and certainty.

Other objects and uses will appear from a detailed description of the invention, which consists in the features of construction and combination of parts hereinafter described and claimed.

Figure 1:
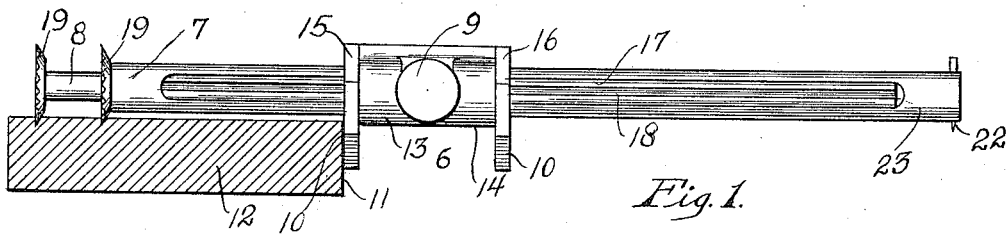
Figure 2:
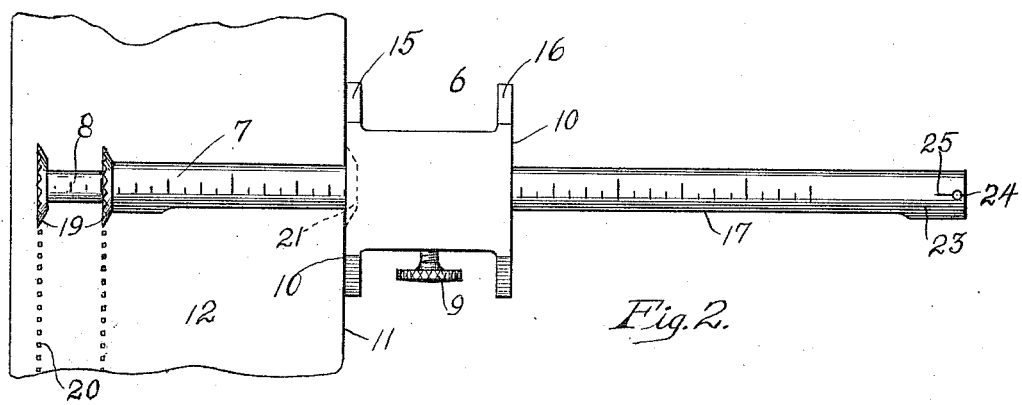
Figure 3:
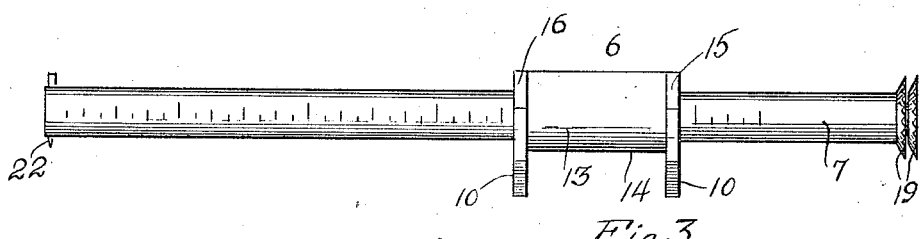
Figure 4:
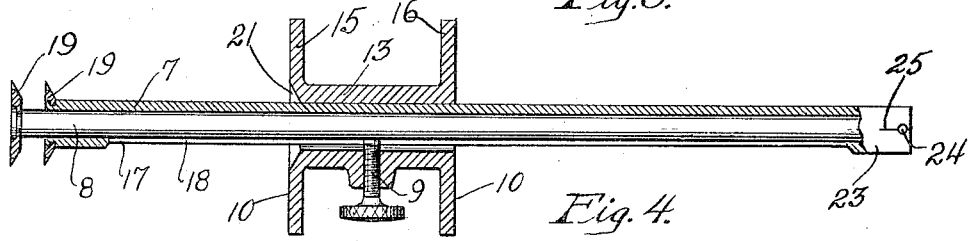
Figure 5:
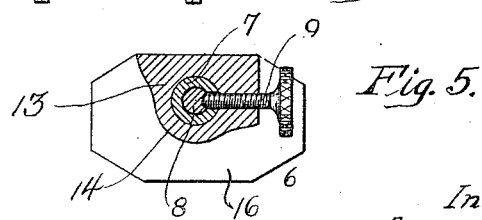

In the drawing—Figure 1 shows a side view of the instrument with its body portion in working position against the edge of a board, both of the rods being projected with respect to the body portion; Fig. 2 shows a plan view similar to Fig. 1, and it shows the form of mark made by the preferred type of marking edge; Fig. 3 shows a side elevation of the instrument, looking in the direction opposite to that of Fig. 1, the rods having their marking edges drawn closely together but both being drawn out into working position with respect to the body portion; Fig. 4 shows a longitudinal section of the instrument, showing one way of attaching the marking members to their respective rods and showing the manner in which the thumb-screw serves to lock both rods at the same operation; and Fig. 5 shows a cross section of the body portion and rods showing also the manner in which the thumbscrew locks both of the rods.

Referring now to the drawings, the instrument comprises a body portion 6 and two or more concentric rods or tubes 7 and 8, which may slide back and forth in a hole through the body portion 6. A thumb screw 9 is provided for locking the rods in any desired position with respect to the body portion.

The body 6 is provided on each end with a flat contacting surface 10, cut at right angles to the hole which receives the rods, so that when one of these contacting surfaces is adjusted against the edge 11 of a board 12 the rods will extend over the face of the board at right angles to its edge. The central portion 13 of the body 6 is preferably undercut in its lower portion 14 so that it may be easily grasped by placing the fingers around this central portion between the end plates 15 and 16.

The outer tube 7 is provided with a longitudinal slot 17, through which the thumb screw may project into a groove 18 on the inner rod. By referring to Figs. 4 and 5 it is evident that tightening the thumb screw 9 will lock both the tube and the rod with respect to the body portion, because the rod will be forced against the side of the tube opposite the thumb screw and the tube on that side will be forced against the body portion. Furthermore, the provision of a slot in the tube and the groove in the rod prevents the rotation of either with respect to the body portion. The desirability of this will be apparent when the markings on the rod and tube are considered.

The rod and tube are each provided on one end with a marking member 19. This is preferably in the form of a little wheel having a corrugated edge and so attached to the rod or tube that it may rotate with respect thereto. When these marking members are drawn across the surface of the board they will each form a series of little indentations 20 thereon, instead of one long, continuous line such as is formed by the ordinary marking point. This form of marking member is preferable to the ordinary point for the reason that a light shining down on the board will strike the edges of the indentations 20 in such a way that lights and shadows will be seen in the indentations, no matter from what direction they are observed. On the contrary, an ordinary scratch does not always show up distinctly, unless it be large or unless the light strike it from exactly the right angle. Furthermore, it is easier to make a mark of the kind herein shown, because the marking members 19 will rotate along the surface of the board instead of catching into the grain and "drawing," as would be the case with a point. When it is desired to make only one mark, the rod 8 may be used, the tube 7 being shoved back tight against the body portion. In order to permit the marking member on the tube to sit up squarely in such manner as not to break the continuity of the surface 10, I provide a recess 21 in which the member 19 may seat. The markings on the rod and tube should preferably be so located that they will be seen when looking down on the top of the instrument. To this end they should be located approximately 90° around the tube and rod from the slot and groove respectively. Furthermore, inasmuch as the distances to be measured by these markings are the distances from the member 19 on the tube to the surface 10 on the body portion, and between the two members 19 respectively, these markings should start at the members 19 and move toward the other end of the tube and rod. Evidently, also, it is unnecessary to graduate them at their opposite ends for a distance equal to that which will be covered by the body portion when they are withdrawn to the maximum amount.

At times it is desirable to use a marking point of the kind ordinarily in use. To this end I provide such a point 22 in the end 23 of the tube, and then graduate the side of the tube opposite to that containing the slot, commencing said graduations with the point 22 and extending them toward the members 19. In order to enable both of the members 19 to be drawn close together, the rod 8 should be short enough so that it will not strike the marking point when the rod is completely inserted within the tube. The preferred manner of attaching this point is to provide holes 24 in the upper and lower surfaces of the tube and then to split the end of the tube through these holes, as at 25, a slight distance so that when the point 22 is driven down through the holes 24 the rod may be expanded a slight amount and thus firmly grip the point and hold it solidly thereafter.

I claim:

In a marking gage the combination of a body portion having a pair of oppositely disposed substantially parallel contact faces, and provided with a transverse hole at substantially right angles thereto, a tubular gaging member entered into the hole of the body portion, and provided with a longitudinal slot, and provided on one end with a gaging wheel and on the other end with a transverse marking pin, a gaging rod entered into the hole of the tube and provided with a longitudinal groove, and provided at one end with a gaging wheel, and being of a length such that it may be completely inserted into the tube to bring its gaging wheel into contact with that of the tube, a lock screw threaded into the body portion and passed through the slot of the tube and engaging the groove of the rod to lock the tube and rod in fixed position with respect to the body, and whereby the tube and rod are held from rotation with respect to the body when the thumb screw is loosened to permit longitudinal movement of the tube and rod, gaging markings on the tube commencing at the gaging wheel end thereof, gaging markings on the rod commencing at the gaging wheel end thereof and located on substantially the same side thereof as the markings on the tube when the rod and tube are held against rotation by the thumb screw, and a series of gaging markings on the tube commencing at the gaging pin end thereof and angularly displaced from the first mentioned set of gaging markings of the tube to prevent confusion between the two sets of markings on the tube, substantially as described.

ALBERT A. HARVIE.

Witnesses:
S. L. VEST,
P. C. ACKLEY.

Copies of this patent may be obtained for five cents each, by addressing the "Commissioner of Patents, Washington, D. C."